United States Patent [19]

Robertson

[11] Patent Number: 4,705,436
[45] Date of Patent: Nov. 10, 1987

[54] DRILL JIG

[75] Inventor: Ian M. Robertson, Wirral, England

[73] Assignee: Channelwood Preservations Ltd., Chester, England

[21] Appl. No.: 743,595

[22] Filed: Jun. 11, 1985

[51] Int. Cl.$^4$ ............................................. B23B 49/00
[52] U.S. Cl. .......................... 408/72 R; 408/115 R; 408/202; 408/241 R
[58] Field of Search ............... 408/72 R, 72 B, 115 R, 408/115 B, 97, 241 G, 181 R, 98, 110, 111, 241 R, 241 B, 202; 33/185, 194; 144/137, 144 R; 427/291

[56] References Cited

U.S. PATENT DOCUMENTS

| 706,392 | 8/1902 | Corliss | 408/103 |
| 4,039,266 | 8/1977 | O'Connell | 408/241 S |
| 4,048,353 | 9/1977 | Stewart et al. | 408/59 |

FOREIGN PATENT DOCUMENTS

| 912736 | 8/1946 | France | 408/72 R |
| 2024674 | 1/1980 | United Kingdom | 408/241 G |
| 2113282 | 8/1983 | United Kingdom | |
| 2130936 | 6/1984 | United Kingdom | |

Primary Examiner—Z. R. Bilinsky
Attorney, Agent, or Firm—John S. Hale

[57] ABSTRACT

A drill jig for making a channel in a timber for containing flowable preservative comprises a body (10) having a first or perpendicular guide bore (20), a second or oblique guide bore (22) and a third or vertical guide bore (24). The guide bores (22) and (24) intersect in a cylindrical locating spigot (18) and the axes of the guide bores (20) and (22) intersect in the timber to be drilled. A collet (26) on the shank of the drill bit (28) limits the depth of penetration by the lower face (32) of the collet abutting an abutment face (34) on the body (10). The depth of pentration when using the guide bore (20) or (24) is limited by the collet (26) coming into abutment with an adjustable stop (38) on the body (10). No adjustments are necessary as between drilling perpendicular or oblique bores and it is ensured that the bores formed in the timber intersect to form a continuous channel for receiving flowable preservative.

12 Claims, 6 Drawing Figures

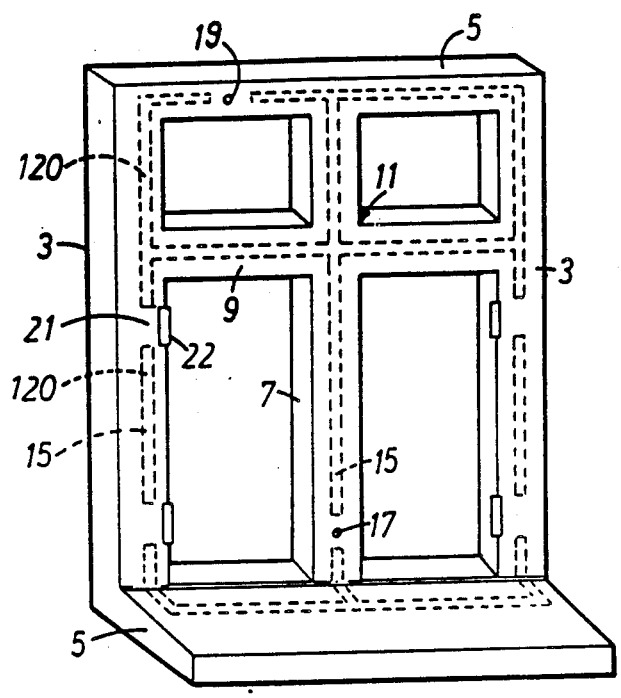
Fig_1.
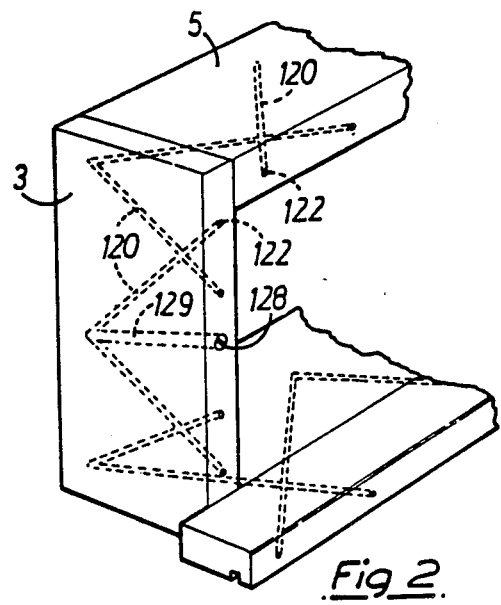
Fig_2.

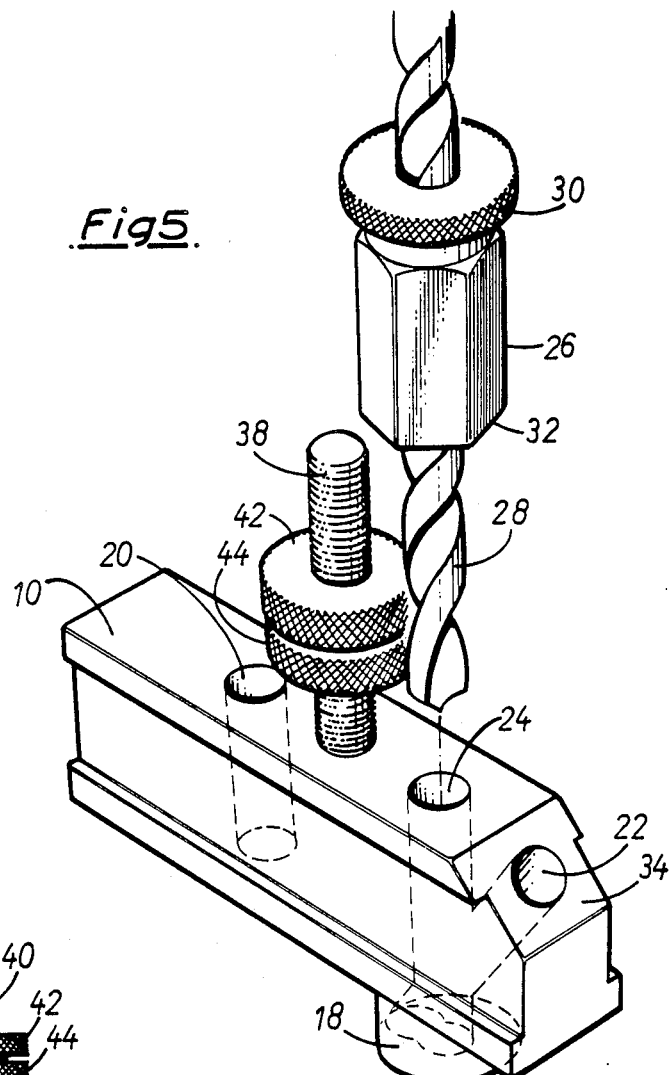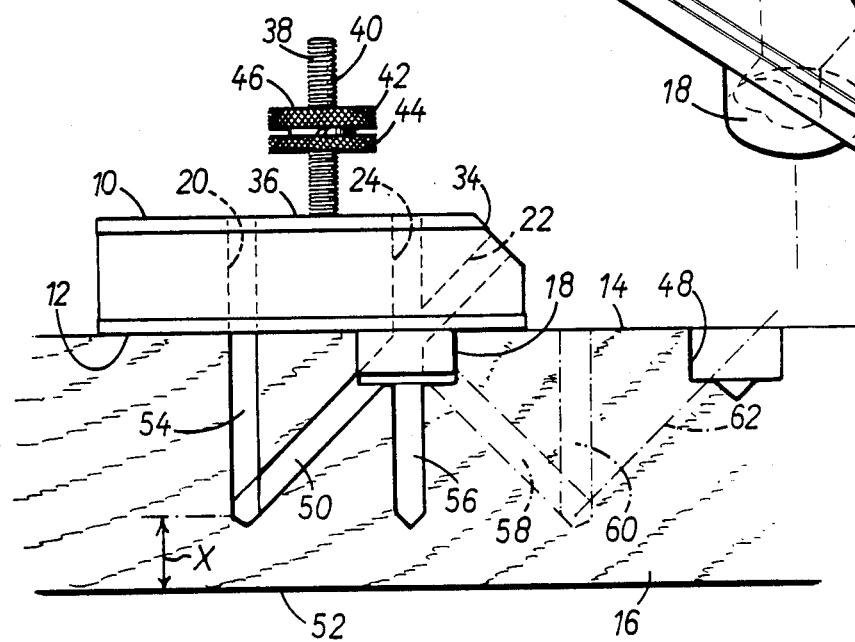

DRILL JIG

DESCRIPTION

The present invention relates to timber preservation and more particularly to a drill jig to assist in drilling intersecting bores in timber to form a channel to receive and retain a timber preservative.

In my U.K. Patent Specification No. 2113282 A published Aug. 3, 1983, there is described a method of treating a wooden frame, such as a window frame, with a preservative, in which the members making up the frame are drilled from a surface of the members at predetermined localities along the length thereof to form bores, at least some of which are angled so that the bores intersect to form a channel, and in which a fluid preservative is introduced into the channel which is thereafter closed off. In my U.K. Patent Specification No. 21 30936A published June 13, 1984, there is described a drill jig for drilling the bores in the timber, which drill jig comprises a body formed with an inclined guide bore and having a locating spigot adapted to be received in a bore formed in the timber to be drilled.

The use of the drill jig described in the said U.K. Patent Specification No. 2130936A entails a series of blind locating bores being formed beforehand in the length of timber to be drilled and the drill jig being angularly located in an exact position with the cylindrical spigot located in one of the blind locating bores so that the drill bit then inserted through the guide bore to drill a hole which intersects a hole previously drilled. The need to carefully position the jig so that the bores do intersect makes the whole operation slow and hazardous in as much as, if the bores do not intersect, then a continuous channel which can be filled with preservative is not formed.

It is an object of the present invention to provide a drill jig which enables several holes to be drilled in the timber such that the holes will always intersect.

It is another object of the present invention to provide such a drill jig which can be used for drilling both oblique holes and substantially perpendicular holes such that the depth of penetration of the drill into the timber is limited by means of adjustable stops and such that the bores intersect and are drilled to substantially the same depth within the timber despite the inclined bores being longer than the substantially perpendicular bores and without having to make any adjustments as between drilling the inclined bores and drilling the substantially perpendicular bores.

A drill jig according to the present invention comprises a body having a base surface adapted to be placed against a face of a length of timber to be drilled, locating means for locating said body on said timber face, said body having first and second drill guide bores therethrough, said first guide bore being perpendicular to said base surface or at least approximately so and said second guide bore being at an acute angle to said first guide bore such that the axis of the guide bores intersect in the timber to be drilled, a depth stop adapted to be attached adjustably to a drill or to a drill bit so as to limit the depth of penetration of the drill bit, when received in said second guide bore, by said depth stop coming into abutment with an abutment face on said body, and an adjustable abutment disposed on the body so as to be abutted by said depth stop when said drill bit is received in said first guide bore, to limit the depth of penetration.

Conveniently the locating means comprises a locating spigot on said body and projecting from said base surface so as to be received in a locating bore formed in said timber face. The locating spigot is preferably cylindrical so that the drill jig can be disposed at any desired angular position on the length of timber and in particular can be disposed at two substantially diametrically opposed angular positions to enable two sets of bores to be drilled from the same locating bore. To this end it is advantageous for the second oblique guide bore to pass through the spigot.

To increase the number of holes which can be drilled using the drill jig, it is preferable for the body to have a third guide bore which is substantially perpendicular to said base surface, the axis of the second and third guide bores intersecting and the first, second and third guide bores being substantially co-planar. It is convenient for the adjustable abutment to be so disposed on the body, e.g. mid-way between the first and third guide bores, such that the adjustable depth stop comes into abutment with the adjustable abutment where the drill bit is received in the first guide bore or the third guide bore.

The present invention will now be described, by way of example only, with reference to the accompanying drawings, in which:

FIG. 1 is a simplified perspective view of a window frame incorporating cavities in accordance with the present invention;

FIG. 2 is a perspective view of part of a window frame showing the location of interconnecting bore holes forming a channel in the frame;

FIG. 5 is a perspective view of a drill jig according to the invention; and

FIG. 6 is a side elevation through a frame member being drilled using the jig of FIG. 5.

Figure 3:
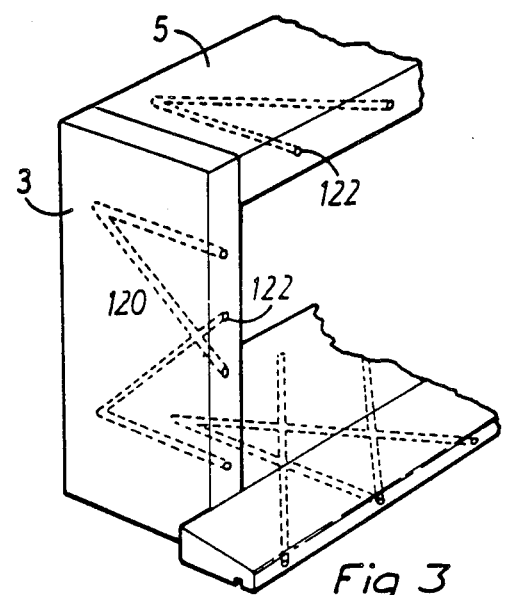
FIG. 3 is a perspective view of part of a window frame showing the location of bore holes according to another embodiment of the invention.

Referring to the drawings, there is shown a wooden window frame 1 having two vertical stiles 3 interconnected by horizontal top and bottom rails 5. The frame is divided into four by an intermediate vertical mullion 7 and a horizontal transom 9 which intersect at 11. The bottom rail 5 forms a cill. Each of the lengths of timber 3, 5, 7 and 9 has therein a longitudinally extending cavity or closed channel 15 (indicated by dotted lines in FIG. 1). The channels 15 are interconnected by various means described further hereinafter. A closeable orifice 17 in communication with the channel 15 is provided at any convenient location in the frame. A bleed port 19 may be provided in the channel 15 at the highest point thereof. The arrangement is such that wood preservatives may be injected into the closed channel 15 by way of the closeable orifice 17 so as to fill the interconnecting channels 15 and penetrate the wood. The wood preservative is preferably injected under pressure at say, 100 p.s.i. (7.8 bar). The closeable orifice 17 is formed by a non-return ball valve which is screwed into a threaded hole (say 10 mm diameter), formed in the timber. The preservative is absorbed in a direction from the inside out. Thus periodic treatment can be carried out without disturbing any external coating on the wood.

Figure 4:
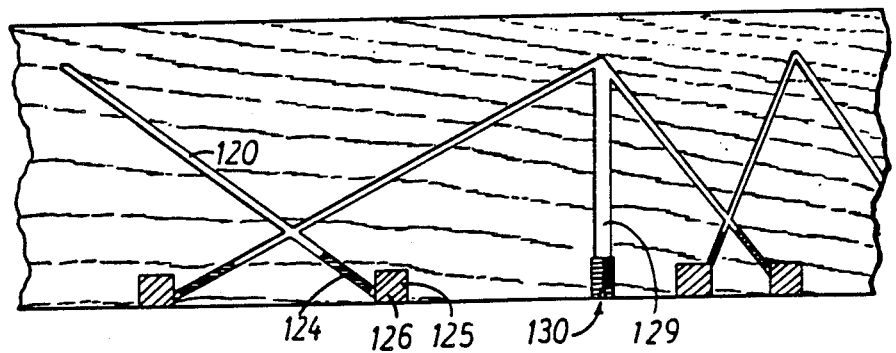
FIG. 4 is a section through a timber member showing one arrangement for forming and plugging the bore holes.

In the embodiment, illustrated in FIGS. 2, 3 and 4, the continuously extending cavity is formed in wooden members 3, 5 of a window frame by a plurality of bores 120 which are drilled into the wood at an angle, so that adjacent bores intersect. Part of a frame is shown in FIG. 2 with the interconnecting bores shown by the dotted lines. The bores 120 are drilled from any convenient face of the wood frame, and each bore hole 122 is filled with a plug 124 which is preferably glued in position. A hot melt adhesive may be employed. In the arrangement shown in FIG. 4 two plugs are employed. A first plug 124 is inserted into the bore hole 122 and a second bore 125 drilled perpendicularly to the face of the timber receives a second plug 126. Glue is introduced behind the plug 124, and the second plug is finished flush with surface of the wood. The second plug is approximately 12 mm in length and cut across the grain.

The bores 120 of adjacent members of the frame are arranged to connect where the members 3 and 5 are joined together so that a frame can be treated from one filler point 128. The filler point is connected to the bores 120 by way of a bore 129 provided with a filled adaptor. Alternatively, one of the openings 122 of the bores 120 may be fitted with the filler adaptor.

The adaptor can comprise a nipple which can be screwed into the wood to align with the bore 129. A tube or other connecting means may be fitted to the nipple to permit preservative to be introduced into the cavity from a suitable applicator. This may be done under a pressure of up to 100 p.s.i. (7.8 bar) as previously described. In one embodiment, once the cavities have been filled, and where necessary, the fluid allowed to penetrate into the wood under pressure, the filler adaptor is removed and a threaded blanking plug 130 screwed in position in place of it. The blanking plug is preferably a plastic, such as nylon. As an alternative, a spring-loaded non-return valve may be employed as the filler adaptor and blanking plug.

The bores 120 can be formed at any convenient angle and the overlap between adjacent bores can be varied. The more the adjacent bores overlap then the better the treatment of wood, since more holes would be required for a given length of wood. The adjacent bores may be commenced from the same surface bore, i.e. without overlap.

Typically the bores 120 are 6 mm diameter and the filler hole 129, 10 mm diameter. Only one filler hole is needed and a vent hole is not necessary when the preservative is injected under pressure.

After the channels, i.e. bores, 120 have been drilled they are preferably cleaned out using compressed air. With the bore openings 122 blocked off, the system can be tested for leaks etc. using air pressure.

Where it is required to inject wood preservative into a timber structure, such as a window frame, door frame or the like, which already has the internal channelways, the liquid is introduced from a commercial dispenser and delivered under minimum pressure or controlled pressure via a non-return valve of the dispenser and an adaptor and nozzle which connects with the orifice 17 in the timber. The orifice has a threaded portion for connection with the nozzle of the dispenser. Alternatively, the nozzle may be received in the orifice as a tapered fit. The liquid is injected so as to fill to capacity all the interconnecting channels beneath the surface of the timber frame. The applicator is then removed thus leaving the injected fluid concealed within the timber members where it will, in due course, permeate through and across the grain of the entire frame. Further fluid may be injected at convenient intervals, thus ensuring the preservation of the timber for a lengthy and indefinite period.

The channels in each member may be arranged to connect with one another at the joints between the bars making up the frame. Alternatively, separate channels for each member of the frame may be provided.

Where there is a possibility of excessive seepage via ill fitting joints caused by incorrect manufacture or consequent warping or shrinkage of timber, it may be desirable to isolate the corner joints from the channel. Thus, the channel would terminate adjacent the corner joint in which case the channel would not be a continuous cavity round the entire frame.

Clearly it can be seen that, if undue seepage of fluid via ill fitting joints or misplaced nail holes, or knot holes etc., etc. did occur, then the specific and offending section could be isolated, thus receiving its quota of preservative fluid on a strictly controlled basis.

When it is required to inject wood preservative into a timber structure, such as a window frame, door frame or the like, which already has the internal channelways, the liquid is introduced from a commercial dispenser and delivered under controlled pressure via a non-return valve of the dispenser and via a pressure chamber into the channel of the frame until pressure is seen to build up. At that point air from the compressor is introduced at 100 p.s.i. (7.8 bar) and maintained for a period of three minutes or until traces of preservative are seen to be exuding from the frame. The multi nozzle connectors which fit into the orifice 128 in the timber have a threaded portion for connection with the nozzles of the pressure chamber. Alternatively, on a different model a single nozzle may be received into the orifice as a tapered fit. The liquid is injected so as to fill to capacity.

The pressure chamber is capable of receiving liquid preservative from a suitable dispenser (Tecalamit oil pump) via a non-return and then distributing the liquid via a single or multi nozzle outlets into the timber frame. It follows that more than one frame member can be filled at one time.

The pressure chamber consists of a cube of heavy gauge steel which is capable of withstanding the pressures required. It has various component parts attached to it comprising:

(i) a pressure gauge zero to 150 p.s.i.(11.2 bar)
(ii) an air vent
(iii) inlet ¼ B.S.P. complete with non-return valve to accept liquid preservative from the dispenser.
(iv) inlet ¼ B.S.P. complete with non-return valve to accomodate air from a compressor.
(v) multi nozzle outlets all uniform size presently ¼ inch B.S.P.
(vi) all nozzle outlets and inlets have their own independent stop cock valve attached.

The chamber need only hold a fairly small reserve of liquid, 200 cc being satisfactory, since the dispenser is capable of pumping sufficient liquid through the pressure chamber directly to the frame members. When the frame has taken its immediate fill of liquid the balance fills the pressure chamber to capacity until a small pressure begins to register on the pressure gauge. At this point the air is introduced from the compressor at 100 p.s.i, (7.8 bar) and held for about three minutes or until liquid is seen to exude from the joints. At this stage the appropriate stop cocks are turned off and the apparatus removed from its connection to the frame member, and a blanking plug preferably made of nylon bearing its own 10 mm thread is screwed into the aperture or filler hole. As an alternative, a ball bearing non-return valve may be employed as the filler/blanking plug combined. However, this is less preferable on account of the valve protruding from the timber member, which would not be particularly acceptable to following tradesmen e.g. window cleaners etc. The bores can be formed at any convenient angle and the overlap between adjacent bores can be varied to suit particular circumstances, provided that as a general rule they intersect at about 18 mm below the outer surface of the member, and terminate at about 15 mm from the rear face. These distances will accommodate the pressure in question for the period in question and ensure that the timber is adequately supplied with preservative.

Typically the bores are 6.4 mm in diameter and the filler holes 10 mm threaded. Only one filler hole is needed per section and a vent hole would be optional, but would however be relevant if subsequent "fillings" were carried out under gravity feed.

A suitable preservative is a solution of pentachlorophenol 5% in white spirit (high grade).

Insecticides such as those known by the trade names Lindane or Dieldrin may be added to the preservative. A water-repellent may also be incorporated.

Advantageously the first treatment with wood preservative may be preceded by treatment with a wetting agent which acts to increase permeability of the wood preservative. The final treatment may be followed by treatment with a water repellent. The treatment may be carried out under pressure to increase penetration.

The method has the advantage over any existing treatments that topping up is possible at intervals until the desired saturation is achieved; the whole length of the frame is protected; there is virtually no loss due to evaporation; and leaching out of the minerals is not possible.

A suitable drill jig to assist in drilling the holes 120 is shown in FIGS. 5 and 6 of the drawings.

The drill jig shown in FIGS. 5 and 6 comprises a body 10 having a base surface 12 adapted to be placed against a face 14 of a length 16 of timber to be drilled. The length 16 of timber will usually be a member of a window frame which is to be treated with a flowable preservative for which purpose it is desired to form a continuous channel in the length of timber as described in the above-mentioned U.K. Patent Specification No. 2113282A.

Towards one end, the body 10 has a cylindrical locating spigot 18 which projects from the base surface 12. The body 10 has a first guide bore 20 which is perpendicular to the base surface 12 or nearly so, a second or oblique guide bore 22 which is at an acute angle to the guide bore 20 and a third guide 24 which is perpendicular to the base surface 12 and which is co-axial with the spigot 18. The axes of the guide bores 20, 22 and 24 are co-planar and such that the axis of the oblique bore 22 intersects the axis of the perpendicular bore 20 in the length 16 of timber. The oblique guide bore 22 also passes through the spigot 18 and intersects the third guide bore 24 in the spigot.

A depth stop 26 in the form of an adjustable collet is fitted around the shank of the drill bit 28 which is to be used for drilling the intersecting bores in the timber. An ordinary hand drill (not shown) may be used for drilling. The collet 26 can be locked in adjusted position on the shank of the drill bit 28 by means of a thumb screw 30. When the drill bit is being used for drilling the inclined bore 22, the end surface 32 of the depth stop comes into abutment with an abutment face 34 on the body 10 to limit the depth of penetration of the drill bit into the timber. The abutment face 34 is suitably disposed and inclined so that this abutment face is perpendicular to the oblique bore 22 and so that the oblique bore extends substantially centrally from this abutment face 34. Because the length of the oblique bore drilled in the timber is greater than the actual depth within the timber to which this bore extends, if the depth stop 26 were simply allowed to come into contact with the top face 36 of the body 10 when drilling a perpendicular bore in the timber 16 through the guide bore 20 or 24, the hole in the timber would be too deep and might even pass right through the timber which would prevent the flowable preservative to be introduced later from being retained in the channel being formed by the intersecting bores. To avoid having to re-adjust the depth stop 26 as between drilling perpendicular and oblique bores, an adjustable abutment 38 is provided on the body 10 mid-way between the bores 20 and 24. This adjustable abutment 38 comprises a screw threaded stud 40 on which are disposed a thumb screw 42 and a lock nut 44, a lock washer preferably being disposed between the thumb screw and lock nut. As can be seen from FIG. 5, the face 32 of the depth stop 26 comes into abutment with the upper face 46 of the thumb screw 42 when the drill bit 28 is received in the bore 20 or in the bore 24 to limit the depth of penetration of the drill bit when drilling perpendicular holes in the timber.

In the use of the drill jig as shown in FIG. 6, blind bores 48 of the same diameter as the spigot 18 are first formed at pre-determined spaced intervals along the length 16 of timber. The depth stop 26 is adjusted along the shank of the drill bit 28 so that the oblique bore 50 to be formed in the timber by insertion of the drill bit through the oblique hole 22 will reach a depth in the timber spaced a small distance X from the rear face 52 of the timber opposed to the face 14. Thereafter the adjustable abutment 38 on the body 10 is adjusted so that, when the drill bit 28 is inserted in either of the perpendicular holes 20 and 24, the drill bit will penetrate through the timber so that the perpendicular bores 54 and 56 terminate the same distance X short of the rear surface 52 of the timber.

The jig is placed on the length of timber so as to extend lengthwise thereof as shown in FIG. 2 with the spigot 18 located in one of the locating bores 48. With the one setting of the drill jig all three bores 50, 54 and 56 are drilled without having to make any adjustment to the depth stops 26 or the abutment 38. Thereafter the drill jig is swivelled through 180° with the spigot 18 remaining located in the locating bore 48 and another oblique bore 58 and another vertical bore 60 are drilled using the guide holes 22 and 20 respectively. Thus it can be seen that it is guaranteed that all of the bores 50, 54, 56, 58 and 60 will intersect i.e. intercommunicate.

Thereafter, the drill jig can be transferred to the next locating bore 48 in the length of timber and first the body 10 is adjusted so that the drill guide bore 20 registers with the perpendicular bore 60 already formed. Then the oblique bore 22 is used to guide the drill bit for drilling a further oblique bore in the timber along an axis 62 and such bore will intersect the bores 58 and 60 at the same depth X form the rear face 52 of the timber.

Thereafter further bores can be drilled in the timber as already described and all such bores intercommunicate to form the desired channel which can be filled with preservative, as described above with reference to FIGS. 1 to 4.

While the guide bore 20 is shown in FIG. 6 as being perpendicular to the base surface 12, it may be inclined a few degrees to the perpendicular either towards or away from the axis of the locating spigot 18 so that the drilled bore 54 intersects the oblique bore 50 at a lesser or greater depth in the length 16 of timber than illustrated. In this respect, when drilling thicker timber, the depth stop 26 is adjusted for drilling to a greater depth, whereby the bores 50 and 54 extend below their point of intersection.

In another embodiment, the adjustable abutment comprises a slide which can slide lengthwise of the body 10 and can be locked in any selected position, e.g., by means of a manually operable lock screw, and which has the screw threaded stud thereon with the thumb-screw and lock nut. Such embodiment has two or more vertical guide holes 20 spaced apart length wise of the body 10 and the slide is locked in a suitable position to be engaged by the depth stop when using a selected one of the vertical guide holes. Since the perpendicularly drilled hole must always intersect the obliquely drilled hole, the guide hole further from the locating spigot is only used when drilling thicker timber.

I claim:

1. A drill jig for use with a drill fitted with a drill bit, comprising a body having a base surface adapted to be placed against a face of a length of timber to be drilled; locating means for locating said body on said timber face; said body having first and second drill guide bores therethrough, said first guide bore being at least approximately perpendicular to said base surface and said second guide bore being at an acute angle to said first bore such that the axes of the guide bores intersect in the timber to be drilled; a depth stop adapted to be connected to the drill bit; an abutment face on said body so as to limit the depth of penetration of the drill bit when received in said second guide bore by coming into abutment with said abutment face on said body; and an adjustable abutment disposed on the body so as to be abutted by said depth stop when said drill bit is received in said first guide bore to limit the depth of penetration.

2. A drill jig according to claim 1, in which said locating means comprises a locating spigot on said body and projecting from said base surface so as to be received in a locating bore formed in said timber face.

3. A drill jig according to claim 2, in which said locating spigot is cylindrical.

4. A drill jig according to claim 1, in which said body has a third guide bore substantially perpendicular to said base surface such that the axes of said second and third guide bores intersect and such that said adjustable depth stop comes into abutment with the said adjustable abutment on said body when said drill bit is received through said third guide bore to limit the depth of penetration.

5. A drill jig according to claim 4, in which said locating means comprises a locating spigot on said body and projecting from said base surface so as to be received in a locating bore formed in said timber face., and in which said second and third guide bores pass through said spigot such that the second and third guide bores intersect within said spigot.

6. A drill jig according to claim 5, in which said locating spigot is cylindrical; and in which said third guide bore is co-axial with said spigot.

7. A drill jig according to claim 1, in which said adjustable abutment comprises a nut or a screw threaded stud on said body.

8. A drill jig according to claim 1, in which said depth stop comprises a collet adapted to be received on the shank of the drill bit.

9. A drill jig according to claim 1, in which said body comprises a solid block.

10. A drill jig for use with a drill fitted with a drill bit, comprising a body having a base surface adapted to be placed against a face of a length of timber to be drilled; locating means for locating said body on said timber face; said locating means comprising a locating spigot on said body projecting from said base surface so as to be received in a locating bore formed in said timber face, said body having first and second drill guide bores therethrough, said second guide bore passing through said spigot; said first guide bore being at least approximately perpendicular to said base surface and said second guide bore being at an acute angle to said first bore, such that the axes of the guide bores intersect in the timber to be drilled; a depth stop adapted to be connected to drill means; an abutment face on said body so as to limit the depth of penetration of the drill bit when received in said second guide bore by said depth stop coming into abutment with said abutment face on said body; and an adjustable abutment disposed on the body so as to be abutted by said depth stop when the drill bit is received in said first guide bore to limit the depth of penetration.

11. A drill jig according to claim 10, in which said locating spigot in cylindrical.

12. A drill jig according to claim 10, in which said body has a third guide bore passing through said spigot and substantially perpendicular to said base surface, such that the axes of said second and third guide bores intersect within said spigot.

* * * * *